(12) United States Patent
Nomura

(10) Patent No.: US 6,659,061 B2
(45) Date of Patent: Dec. 9, 2003

(54) ENGINE BALANCER

(75) Inventor: Akifumi Nomura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/198,993

(22) Filed: Jul. 22, 2002

(65) Prior Publication Data

US 2003/0037752 A1 Feb. 27, 2003

(30) Foreign Application Priority Data

Aug. 22, 2001 (JP) .................................... 2001-252169

(51) Int. Cl.[7] ................................................ F16C 3/04
(52) U.S. Cl. .................................................. 123/192.2
(58) Field of Search ........................ 123/192.2; 74/603, 74/604

(56) References Cited

U.S. PATENT DOCUMENTS

| 5,218,885 A | * | 6/1993 | Nakano et al. | ............... 74/591 |
| 6,260,532 B1 | * | 7/2001 | Mendler | .................. 123/192.2 |
| 2003/0111037 A1 | * | 6/2003 | Takahashi | ................ 123/192.2 |

FOREIGN PATENT DOCUMENTS

JP  2-118227  5/1990

* cited by examiner

*Primary Examiner*—Willis R. Wolfe
*Assistant Examiner*—Douglas A Salser
(74) *Attorney, Agent, or Firm*—Birch, Stewart, Kolasch & Birch, LLP

(57) ABSTRACT

A balancer shaft is supported between a right case and a left case in parallel with a crankshaft. A balancer driven gear and a first balance weight are provided at one end with the balancer driven gear being interlocked with the crankshaft. The outer diameter R2 of a maximum diameter of the first balance weight is larger relative to a root circle diameter R1 of the balancer driven gear. The first balance weight is attached to an outside face of the balancer driven gear. A fitting end of a driving shaft is fitted into a fitting hole provided in the core at the end on the side on which the balancer driven gear is provided of the balancer shaft. The fitting end and the fitting hole are coupled to be integrally rotated and for driving a water pump. A second balance weight is integrated with the other end of the balancer shaft. A gear for driving an accessory is integrated with the base of the second balance weight and is engaged with an oil pump gear for driving an oil pump.

24 Claims, 4 Drawing Sheets

ENGINE BALANCER

CROSS-REFERENCE TO RELATED APPLICATIONS

The present application claims priority under 35 USC 119 to Japanese Patent Application No. 2001-252169 filed on Aug. 22, 2001 the entire contents thereof is hereby incorporated by reference.

BACKGROUND OF THE INVENTION

1. Field of the Invention

The present invention relates to a balancer for an engine.

2. Description of Background Art

Japanese published examined Patent Application No. Hei 2-118227, discloses a balancer for an engine that is provided with a balance weight at both ends of a balancer shaft. A balance weight positioned on the side of a balancer gear, that is separate from the balancer gear, is formed so that the outer diameter is smaller than the root circle diameter. The balance weight is arranged inside the balancer gear.

It is also conceivable that a balancer gear may be made to have the form of a balance weight. However, since such a gear has an anomalous outline, it has a tendency for the precision of the gear to be deteriorated by distortion after heat treatment. When the balance weight is made separate from the balancer gear, the above-mentioned problem can be solved. However, in the case of a balance weight having a smaller diameter than the root circle diameter, the width of the balance weight is increased to secure a sufficient unbalance amount. This increases the size of the engine with an increase in the weight.

SUMMARY AND OBJECTS OF THE INVENTION

An object of the present invention is to provide a balancer that can acquire an unbalance amount efficiently and can contribute to the miniaturization and the reduction in the weight of the engine.

To solve this problem, the present invention provides a balancer of an engine that is configured so that a balance weight that is provided on a balancer shaft parallel to a crankshaft of the engine is rotated by a balancer gear interlocked with the crankshaft and includes the balance weight that is formed as another member the diameter of which is larger than the root circle diameter of the balancer gear and is jointly fastened to the side of the balancer gear.

The present invention includes the balancer gear that is fitted to the balancer shaft via a spline, a fitting hole is provided to the end on the side of the balancer gear of the balancer shaft and an accessory driving member is fitted into the fitting hole.

The present invention provides a balancer for an engine wherein a balance weight is provided to both ends of a balancer shaft parallel to a crankshaft of the engine which is configured so that the balance weights are rotated by a balancer gear interlocked with the crankshaft and includes a balancer driven gear that is provided to one end of the balancer shaft. A balance weight is integrated with the other end a gear for driving an accessory that is provided to the inner side of the balance weight.

According to the present invention as the outer diameter of the balance weight is constructed to be larger than the root circle diameter of a balancer driven gear in a structure where a separate balance weight is formed outside the balancer driven gear rotated by the transmission of power from a balancer drive gear fixed to the crankshaft, a sufficient unbalance amount can be efficiently secured. As a result, the width of the balance weight can be minimized. Thus, an increase in the width of the engine is inhibited and the engine can be lightened and miniaturized.

Also, as the balance weight is separate from the balancer driven gear, the balance weight the diameter of which is made larger than the root circle diameter of the balancer driven gear can be arranged very near to the balancer driven gear. In case a balance weight having such a large diameter is integrated with a balancer driven gear, the teeth of the balancer driven gear cannot operate. However, according to the present invention such a manufacturing problem is not caused. Thus, the balance weight can be easily fixed to the balancer shaft by jointly fastening the balance weight to the side of the balancer driven gear.

According to the present invention, as the balancer gear is fitted to the balancer shaft via a spline, the fitting hole is provided to the end on the side of the balancer gear of the balancer shaft and the accessory driving member is fitted into the fitting hole, the accessory can be coaxially driven by the balancer shaft. Since a large space is not require to couple the accessory driving member though the balancer gear and the balancer weight are provided to the end of the shaft, the engine can be miniaturized.

According to the present invention, as the balance weight is provided on both ends of the balancer shaft, the balancer driven gear is provided to one end, the balance weight is integrated with the other end and the gear for driving the accessory is provided to the inner side of the balance weight, the gear for driving the accessory can be provided very near to the balance weight and it does not require a large space to attach the gear for driving the accessory. In addition, on the side of one end of the balancer shaft on which the balancer driven gear is provided, the driving shaft of one accessory is coaxially connected, the driving shaft of the other accessory is turned in parallel with the balancer shaft via the gear for driving the accessory on the side of the other end and the other accessory can also be arranged near one accessory. Therefore, the engine can be miniaturized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
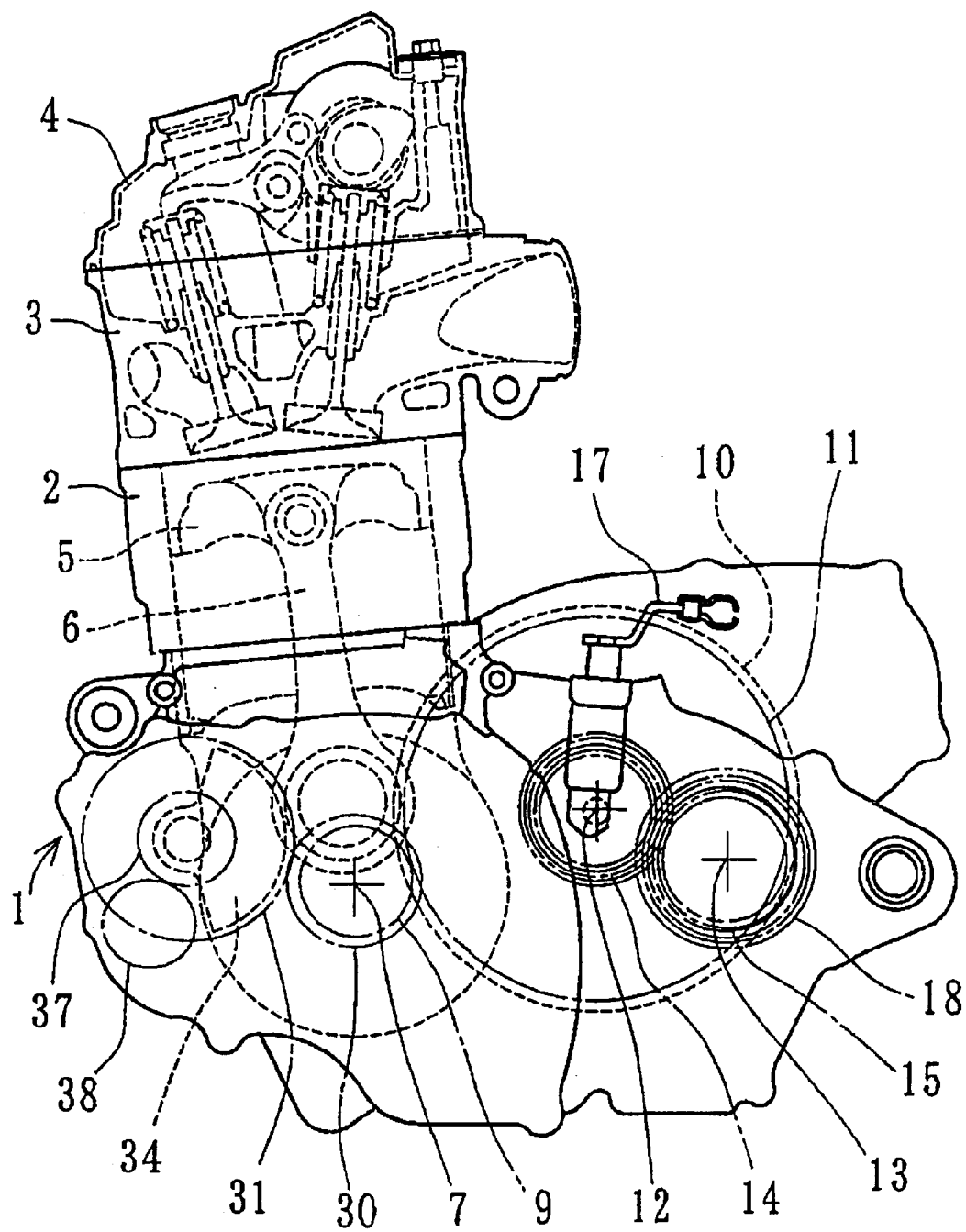
FIG. 1 is a left side view showing a water-cooled four-cycle engine to which this embodiment is applied.

As shown in FIG. 1, an engine according to the present invention includes a cylinder block 2 that is provided over a crankcase 1. A cylinder head 3 and a cylinder head cover 4 are provided on/over the cylinder block. A piston 5 is slid in the cylinder block 2 for reciprocation to cause the crankshaft 7 to rotate (the reference number indicates the center) via a connecting rod 6. The crankshaft 7 is housed in the crankcase 1 and is engaged with a primary driven gear 11 integrated with a clutch 10 via a primary drive gear 9 provided on the crankshaft 7.

The main shaft 12 and the countershaft 13 (the reference numbers indicate the respective center) respectively form a transmission mechanism that is arranged in parallel with the crankshaft 7. Plural transmission gears 14 and 15 provided on the respective main shaft 12 and countershaft 13 are always engaged. The shafts and gears are housed in a transmission case in the crankcase 1. The main shaft 12 is connected to the clutch 10 and intermittently operates the clutch 10 by a clutch lever 17. The combination of the transmission gears 14 and 15 is selected by a well-known gear selecting mechanism and a shift is output to an output sprocket 18 provided to one end of the countershaft 13.

Figure 2:
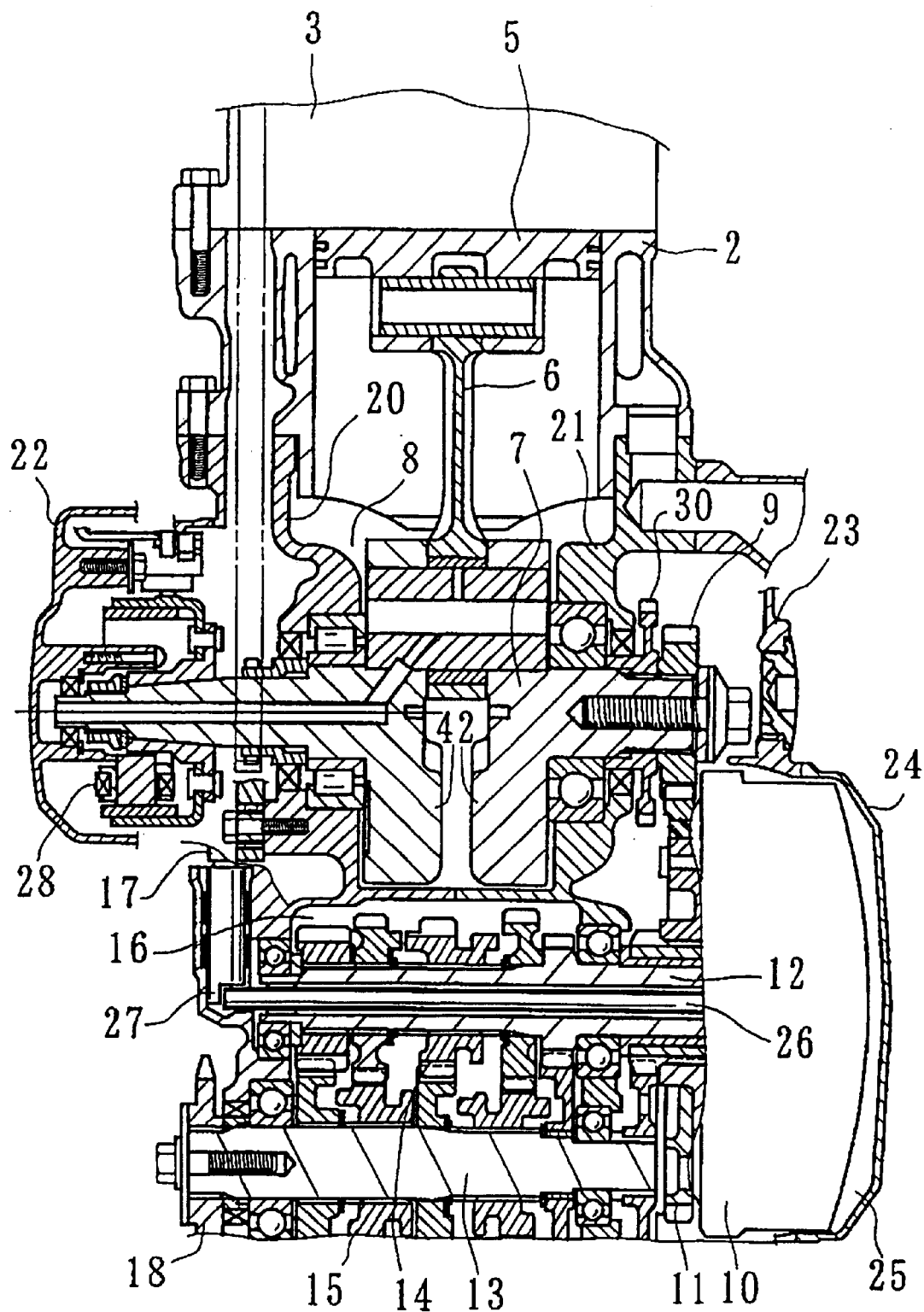
FIG. 2 is a sectional view showing a main part of the engine.

As shown in FIG. 2, the crankcase 1 is divided into right and left parts. The crankcase is composed of a left case 20 on the left side and a right case 21 on the right side. A left case cover 22 and a right case cover 23 are attached to the respective outsides.

The crankshaft 7, the main shaft 12 and the countershaft 13 are respectively supported by a bearing between the left case 20 and the right case 21, and the crankshaft 7 is housed in the crankcase 8 formed in a sealed state between the left case 20 and the right case 21. The transmission mechanism including the main shaft 12, the countershaft 13 and the transmission gears 14 and 15 is housed in a transmission case 16 formed between the left case 20 and the right case 21 next to the crankcase 8. The crankcase 8 is partitioned by the transmission case 16 and a partition to be sealed. A clutch housing 25 is formed among the right case 21, the right case cover 23 and a clutch cover 24, and a wet clutch is housed therein.

The main shaft 12 connected to the clutch 10 is a hollow shaft, a push rod 26 pierces the main shaft and the clutch is intermittently operated by pushing one end of the push rod by a cam 27 formed at one end of the clutch lever 17. An ACG 28 is provided adjacent to one end of the crankshaft 7.

Figure 3:
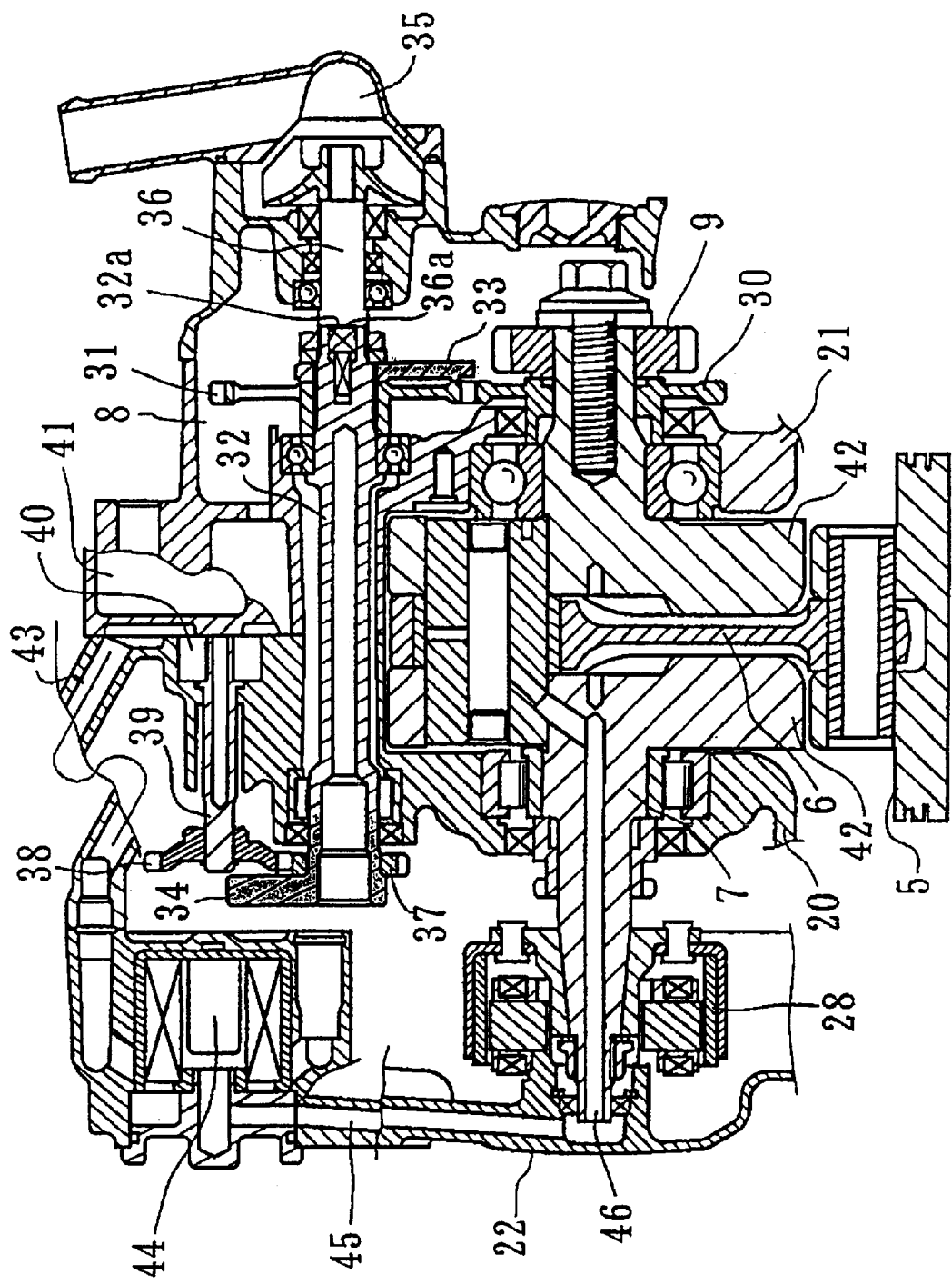
FIG. 3 is a sectional view showing a balancer mechanism.

As shown in FIG. 3, a balancer drive gear 30 is provided in the vicinity of the primary drive gear 9 on the crankshaft 7. A balancer driven gear 31 is engaged with the balancer drive gear that is provided at one end of a balancer shaft 32. The balancer shaft 32 is arranged in parallel with the crankshaft 7 and is supported between the left case 20 and the right case 21 with balance weights 33 and 34 being provided at both ends. One balance weight 33 is provided separately from the balancer driven gear 31 and with one balance weight axially overlapped with the balancer driven gear, and the other balance weight 34 is integrated with the other end of the balancer shaft 32.

An axial fitting hole 32a is provided to the end to which the balance weight 33 is provided of the balancer shaft 32, the end with an anomalous outline 36a formed on a driving shaft 36 of a water pump 35 that is fitted into the axial fitting hole and is coupled to the axial fitting hole so that they can be coaxially rotated integrally for driving the water pump 35 together with the balancer shaft 32.

A separate gear 37 is provided to a boss of the other balance weight 34 so that the gear can be integrally rotated. The gear 37 is engaged with an oil pump gear 38, the oil pump gear 38 rotates an integrated driving shaft 39 and drives an oil pump 40. The driving shaft 39 is supported by the left case 20 in parallel with the balancer shaft 32. The oil pump 40 is formed on the side of the left case 20 and is partially combined with the right case 21.

For the supply of oil to the oil pump 40, oil is sent from an oil reservoir 41 formed at the bottom of the right case 21 of the crankcase 8 to an oil pan via a lead valve not shown by the rotation of a crank web 42. Pressurized oil sent from the oil pump 40 is supplied from a discharge passage 43 to required locations such as an oil passage 46 provided to the core of the crankshaft 7 via an oil filter 44 provided on the inner side of the left case cover 22 and an oil passage 45 formed inside the left case cover 22.

Figure 4:
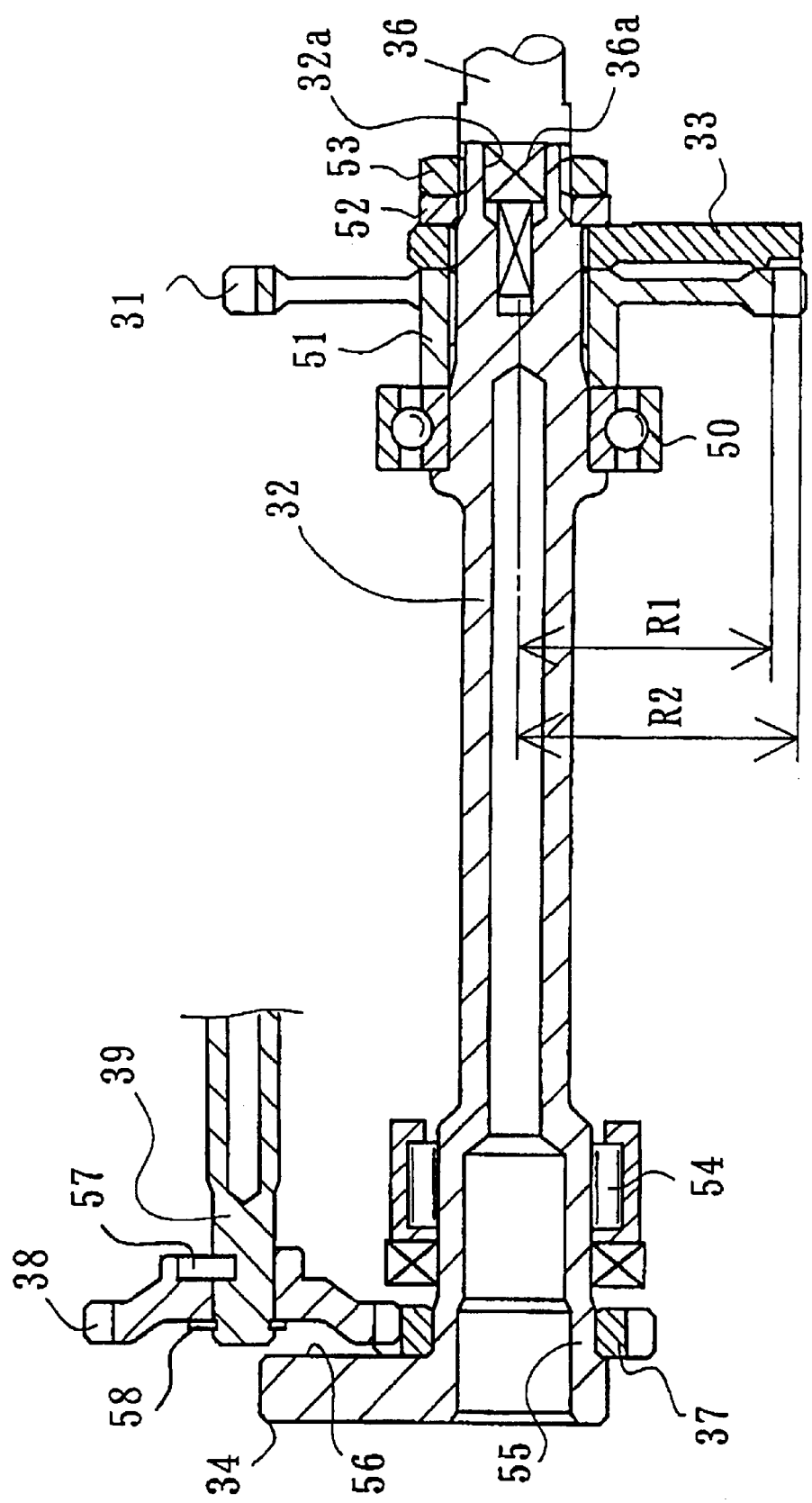
FIG. 4 is an enlarged view enlarging the vicinity of a balancer shaft shown in FIG. 3.

FIG. 4 shows the balancer shaft shown in FIG. 3 in an enlarged state. Referring to FIG. 4, a balancer mechanism will be described further in detail below. One end of the balancer shaft 32 protrudes to the right in FIG. 4 from a ball bearing 50 provided on the right case, a boss 51 of the balancer driven gear 31 is fitted to the protruded end and is connected via a spline. The balance weight 33 overlapping outside the balancer driven gear 31, is connected to the end of the balancer shaft 32 via a spline, and the balancer driven gear 31 and the balance weight 33 are fixed to the end of the balancer shaft 32 by a nut 53 via a washer 52.

The balance weight 33 has non-circular substantially semicircular form. The outer diameter R2 of a part of the balance weight 33 includes a maximum outer diameter that is larger than the root circle diameter R1 of the balancer driven gear 31 and is substantially equal to the outside periphery of the balancer driven gear 31. The maximum diameter is slightly larger, compared with that of the balance weight 34 on the left side, the thickness is substantially equal to a half and is substantially equal to the thickness of the tooth of the balancer driven gear 31. The maximum diameter of the balance weight 34 is substantially equal to the root circle diameter of the balancer driven gear 31 and protrudes outside from the left case.

The fitting hole 32a formed at the end of the balancer shaft 32 protruding from the nut 53 is a hole with an anomalous outline such as a square. The end with the anomalous outline 36a, which is one end of the driving shaft 36 of the water pump which is one of accessories, is fitted and locked into/in the fitting hole so that they can be integrally rotated.

The end on the left side of the balancer shaft 32 is supported by a needle bearing 54 provided to the left case and a part protruding from the needle bearing 54 has a slightly larger diameter to be a boss 55 of the balance weight 34. The gear 37 for driving the oil pump, which is one of accessories, is press-fitted to the outside periphery of the boss 55 and is integrated with the boss. One side of the gear 37 is closely touching to the inner side 56 of the balance weight 34 and is fixed onto the inner side. The width of the gear 37 is wider than that of the oil pump gear 38. The oil pump gear 38 is locked in the driving shaft 39 by a pin 57 and is prevented from falling by a snap ring 58.

Next, the action of this embodiment will be described. When the crankshaft 7 is rotated, the balancer shaft 32 is reversely rotated with the balancer shaft interlocked with the crankshaft 7 via the balancer drive gear 30 and the balancer driven gear 31. The balance weights 33 and 34 are integrally rotated and the vibration of the crankshaft 7 is reduced.

Simultaneously, a driving part of the water pump 35 is integrally rotated via the driving shaft 36 by the rotation of the balancer shaft 32 and cooling water is supplied. Simultaneously, the oil pump 40 is driven by rotating the oil pump gear 38 by the gear 37 integrated with the balance weight 34 and oil is supplied to required locations such as the crankshaft 7.

As the separate balance weight 33 is arranged outside the balancer driven gear 31 rotated by the transmission of power from the balancer drive gear 30 fixed to the crankshaft 7 and the outer diameter R2 of the balance weight 33 is made larger than the root circle diameter R1 of the balancer driven gear 31, a sufficient unbalance amount can be efficiently secured. As a result, the width of the balance weight 33 can be minimized, an increase of the width of an engine is inhibited and the engine can be lightened and miniaturized. In addition, as the balance weight 33 is separate from the balancer driven gear 31, the balance weight 33 that is larger than the root circle diameter R1 of the balancer driven gear 31 can be arranged very near to the balancer driven gear 31.

When the balance weight 33 having such a large diameter is integrated with the balancer driven gear 31, the gear has a tendency for the precision to be deteriorated by distortion after heat treatment because the balancer driven gear 31 has an anomalous outline and the teeth having an unbalanced form cannot be operated. However, according to the present invention such a manufacturing problem is not caused. Thus, the balance weight 33 can be fixed to the balancer shaft 32 easily and compactly by jointly fastening the balance weight 33 to the side of the balancer driven gear 31.

Also, the balancer driven gear 31 is fitted to the balancer shaft via a spline with the fitting hole 32a being provided to the end on the side of the balancer driven gear of the balancer shaft 32. The fitting end 36a of the driving shaft 36 of the water pump is fitted into the fitting hole 32a and the fitting end and the fitting hole are coupled by fitting, the water pump 35, which is an accessory that can be coaxially driven by the balancer shaft 32. Since it does not require a large space to couple the driving shaft 36 though the balancer driven gear 31 and the balance weight 33 are provided to the end of the shaft, the engine can be miniaturized.

Further, since the balance weights 33 and 34 are provided to both ends of the balancer shaft 32, the balancer driven gear 31 is provided to one end (the right side) with the balance weight 34 being integrated with the other end. The gear 37 for driving the accessory that drives the oil pump gear 38 can be provided to the inner side 56 of the balance weight 34 and it does not require a large space to attach the gear 37. Thus, the engine can be miniaturized.

In addition, the driving force transmission path to the oil pump 40 is turned and the oil pump 40 can be arranged near the water pump 35 by coaxially coupling the driving shaft 36 of the water pump 35 to the side of one end of the balancer shaft 32 on which the balancer driven gear 31 is provided and arranging the driving shaft 39 to which the oil pump gear 38 is engaged with the gear 37 for driving the accessory provided at the other end being provided in parallel with the balancer shaft 32. Therefore, the engine can be further miniaturized.

The invention is not limited to the above-mentioned embodiment and various transformations and applications are allowed according to the principles of the present invention. For example, providing an unbalance amount that is secured by building a part made of a material having a large specific gravity between the balancer driven gear 31 and the balance weight 33 and the engine can also be used to miniaturize and lighten.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A balancer for an engine comprising:
    a balance weight provided on a balancer shaft, said balancer shaft being parallel to a crankshaft of the engine, said balance weight being rotated by a balancer gear interlocked with the crankshaft;
    said balancer weight includes a diameter that is larger than a root circle diameter of the balancer gear;
    said balancer weight being jointly fastened onto a side of the balancer gear.

2. The balancer for an engine according to claim 1, wherein:
    the balancer gear is fitted to the balancer shaft via a spline;
    a fitting aperture is provided to an end on the side of the balancer gear of the balancer shaft; and
    an accessory driving member is fitted into the fitting aperture.

3. The balancer for an engine according to claim 1, wherein said balancer weight is removably mounted relative to said balancer shaft.

4. The balancer for an engine according to claim 2, wherein the fitting aperture has an anomalous outline.

5. The balancer for an engine according to claim 1, wherein said balancer weight is substantially semicircular in shape.

6. The balancer for an engine according to claim 1, wherein a thickness of said balancer weight is substantially equal to a thickness of a tooth of said balancer gear.

7. A balancer for an engine comprising:
    balance weights being provided to both ends of a balancer shaft, said balance shaft being parallel to a crankshaft of the engine wherein the balance weights are rotated by a balancer driven gear interlocked with the crankshaft for rotating said balance weights;
    said balancer driven gear being provided to one end of the balancer shaft;
    one balance weight is integrated with the other end; and
    a gear for driving an accessory is provided to an inner side of the balance weight.

8. The balancer for an engine according to claim 7, wherein said first balancer weight is removably mounted relative to said balancer shaft.

9. The balancer for an engine according to claim 7, and further including a fitting aperture provided on the end of the first balancer weight.

10. The balancer for an engine according to claim 9, wherein the fitting aperture has an anomalous outline.

11. The balancer for an engine according to claim 7, wherein said first balancer weight is substantially semicircular in shape.

12. The balancer for an engine according to claim 7, wherein a thickness of said first balancer weight is substantially equal to a thickness of a tooth of said balancer gear.

13. A balancer for an engine comprising:
    a crankshaft;
    a balance shaft being positioned substantially parallel to said crankshaft;

a balance weight provided on one end of said balancer shaft; and a balancer gear positioned on said balancer shaft and being in engagement with said crankshaft of the engine, said balance weight being rotated by said balancer gear;

said balancer weight having a diameter that is larger than a root circle diameter of the balancer gear;

said balancer weight being mounted to one side of the balancer gear.

14. The balancer for an engine according to claim 13, wherein:

the balancer gear is fitted to the balancer shaft via a spline;

a fitting aperture is provided on one end on the side of the balancer gear of the balancer shaft; and an accessory driving member is fitted into the fitting aperture.

15. The balancer for an engine according to claim 13, wherein said balancer weight is removably mounted relative to said balancer shaft.

16. The balancer for an engine according to claim 14, wherein the fitting aperture has an anomalous outline.

17. The balancer for an engine according to claim 13, wherein said balancer weight is substantially semicircular in shape.

18. The balancer for an engine according to claim 13, wherein a thickness of said balancer weight is substantially equal to a thickness of a tooth of said balancer gear.

19. A balancer for an engine comprising:

a crankshaft;

a balance shaft being positioned substantially parallel to said crankshaft;

a first balance weight being provided on one end of the balancer shaft;

a second balance weight being provided on a distal end of said balancer shaft;

said first and second balance weights are rotated by a balancer driven gear interlocked with the crankshaft for rotating said first and second balance weights; and a gear for driving an accessory is provided to the inner side of the second balance weight.

20. The balancer for an engine according to claim 19, wherein said first balancer weight is removably mounted relative to said balancer shaft.

21. The balancer for an engine according to claim 19, and further including a fitting aperture provided on the end of the first balancer weight.

22. The balancer for an engine according to claim 21, wherein the fitting aperture has an anomalous outline.

23. The balancer for an engine according to claim 19, wherein said first balancer weight is substantially semicircular in shape.

24. The balancer for an engine according to claim 19, wherein a thickness of said first balancer weight is substantially equal to a thickness of a tooth of said balancer gear.

* * * * *